(12) United States Patent
Bull et al.

(10) Patent No.: US 10,573,074 B1
(45) Date of Patent: Feb. 25, 2020

(54) EVALUATING DISPLAY ACCURACY

(71) Applicant: Rockwell Collins, Inc., Cedar Rapids, IA (US)

(72) Inventors: Ian J. Bull, Portland, OR (US); Kaylee R. Robinson, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 33 days.

(21) Appl. No.: 15/464,469

(22) Filed: Mar. 21, 2017

(51) Int. Cl.
  *G06T 19/00* (2011.01)
  *G06T 7/246* (2017.01)
  *G06T 3/20* (2006.01)
  *G06T 7/13* (2017.01)
  *G02B 27/01* (2006.01)
  *G06K 9/00* (2006.01)
  *G06K 9/62* (2006.01)
  *G09G 5/38* (2006.01)

(52) U.S. Cl.
  CPC ........ *G06T 19/006* (2013.01); *G02B 27/0101* (2013.01); *G02B 27/0179* (2013.01); *G06K 9/0063* (2013.01); *G06K 9/6202* (2013.01); *G06T 3/20* (2013.01); *G06T 7/13* (2017.01); *G06T 7/246* (2017.01); *G02B 2027/014* (2013.01); *G02B 2027/0183* (2013.01); *G09G 5/38* (2013.01); *G09G 2320/0693* (2013.01); *G09G 2380/12* (2013.01)

(58) Field of Classification Search
  CPC ....... G01C 23/00; G01C 23/005; G02B 27/01
  See application file for complete search history.

(56) References Cited

U.S. PATENT DOCUMENTS

| | | | | |
|---|---|---|---|---|
| 3,574,283 | A | * | 4/1971 | Albers ...................... G01S 1/02 73/178 R |
| 5,910,793 | A | * | 6/1999 | Rogovin .............. G09G 3/3625 345/100 |
| 9,244,281 | B1 | * | 1/2016 | Zimmerman ...... G02B 27/0176 |

OTHER PUBLICATIONS

Flight Path Vector (FPV)—Explanation and Use, Flaps 2 Approach, Jul. 7, 2012.*
Head-Up Display, Robert B. Wood/Peter J. Howells, year 2001 by CRC Press LLC.*
Flight Path Vector (FPV)—Explanation and Use, Flaps 2 Approach, Jul. 7, 2012 (Year: 2012).*
Flight Path Vector (FPV)—Explanation and Use, Flaps 2 Approach, Jul. 7, 2012 (Year: 2013).*
Head-Up Display, Robert B. Wood/Peter J. Howells, year 2001 by CRC Press LLC (Year: 2001).*

(Continued)

*Primary Examiner* — Devona E Faulk
*Assistant Examiner* — Ming Wu
(74) *Attorney, Agent, or Firm* — Suiter Swantz pc llo

(57) ABSTRACT

An image capture device located within an eyebox of a vehicle obtains an image of a virtual image presented on a display of the vehicle. The display includes a conformal display having real-world features associated with the virtual symbology of the virtual image. The image of the virtual image is used to compare pixels of the features to determine whether an error is associated with the presentation of the virtual image on the display. A correction factor may be determined based on the comparison. The correction factor is used to reconfigure the presentation and more accurately display the virtual symbology.

18 Claims, 12 Drawing Sheets

(56) References Cited

OTHER PUBLICATIONS

Society of Automotive Engineers, Inc., Minimum Performance Standard for Airborne Head Up Display (HUD), SAE AS 3055, Mar. 1999, 39 pages, Society of Automotive Engineers, Inc., Printed in the U.S.A.

Robert B. Wood and Peter J. Howells, Head-Up Displays, The Avionics Handbook, Chapter 4, 2001, 24 pages, CRC Press, Printed in the U.S.A.

* cited by examiner

EVALUATING DISPLAY ACCURACY

BACKGROUND

In the past Head-Up Display (HUD) operators have accepted slight misalignments as inevitable. Nevertheless, because a conformal display, such as a HUD, allows an operator of a vehicle increased situational awareness and reduced scanning effort simultaneous with real-time monitoring of critical operational information, the conformal HUD display is increasingly relied upon and often operationally preferred to an available Head-Down Display (HDD), especially in the aviation industry. Due to this preference and increased use, conformal display accuracy requirements are increasing and error tolerances are becoming more stringent Additionally, an overall "perceived" error of HUD is a combination of HUD system tolerances, HUD installation tolerances, sensor system tolerances, sensor system installation tolerances, and vehicle structure build tolerances. Thus, in situations where inaccuracies or display errors do exist, diagnosing a source of error may be difficult and time consuming.

Therefore, it is desirous to obtain display systems, apparatuses, or methods with improved accuracy, precision, and diagnostics with respect to conformal displays, information presented thereon, and testing and evaluation procedures associated therewith.

SUMMARY

In one aspect, the inventive concepts disclosed herein are directed to a method for evaluating display accuracy. In a further aspect, the method includes receiving a first input for presenting a virtual image on a display of a vehicle and a second input for identifying real-world features from an image of the virtual image. In a further aspect, the method includes obtaining the image of the virtual image presented on the display. In a further aspect, the method includes generating a correction factor if the virtual image of the display has an error associated with the presentation on the display based on an analysis of the image. In a further aspect, the method includes adjusting the display or a component associated with the presentation of the virtual image on the display in order to reduce the error or to calibrate the display.

In another aspect, the inventive concepts disclosed herein are directed to an apparatus for evaluating display accuracy. In a further aspect, the apparatus includes at least one input port configured to receive a first input for presenting a virtual image on a display of a vehicle and a second input for identifying real-world features from an image of the virtual image. In a further aspect, the apparatus includes an image processor configured to perform the following steps: obtain the image of the virtual image presented on the display; generate a correction factor if the virtual image of the display has an error associated with the presentation on the display based on an analysis of the image; and adjust the display or a component associated with the presentation of the virtual image on the display in order to reduce the error or to calibrate the display.

In another aspect, the inventive concepts disclosed herein are directed to a system for evaluating display accuracy. In a further aspect, the system includes a camera for obtaining an image of a virtual image on a conformal display of a vehicle. In a further aspect, the system includes a non-transitory memory having instructions embedded thereon. In a further aspect, the system includes a processor in communication with the non-transitory memory and the camera, the processor configured to access the instructions to perform or direct steps, the steps comprising: receiving a first input for presenting a virtual image on a conformal display of a vehicle and a second input for identifying real-world features from an image of the virtual image; obtaining the image of the virtual image presented on the display; generating a correction factor if the virtual image of the display has an error associated with the presentation on the display based on an analysis of the image; and adjusting the display or a component associated with the presentation of the virtual image on the display in order to reduce the error or to calibrate the display.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
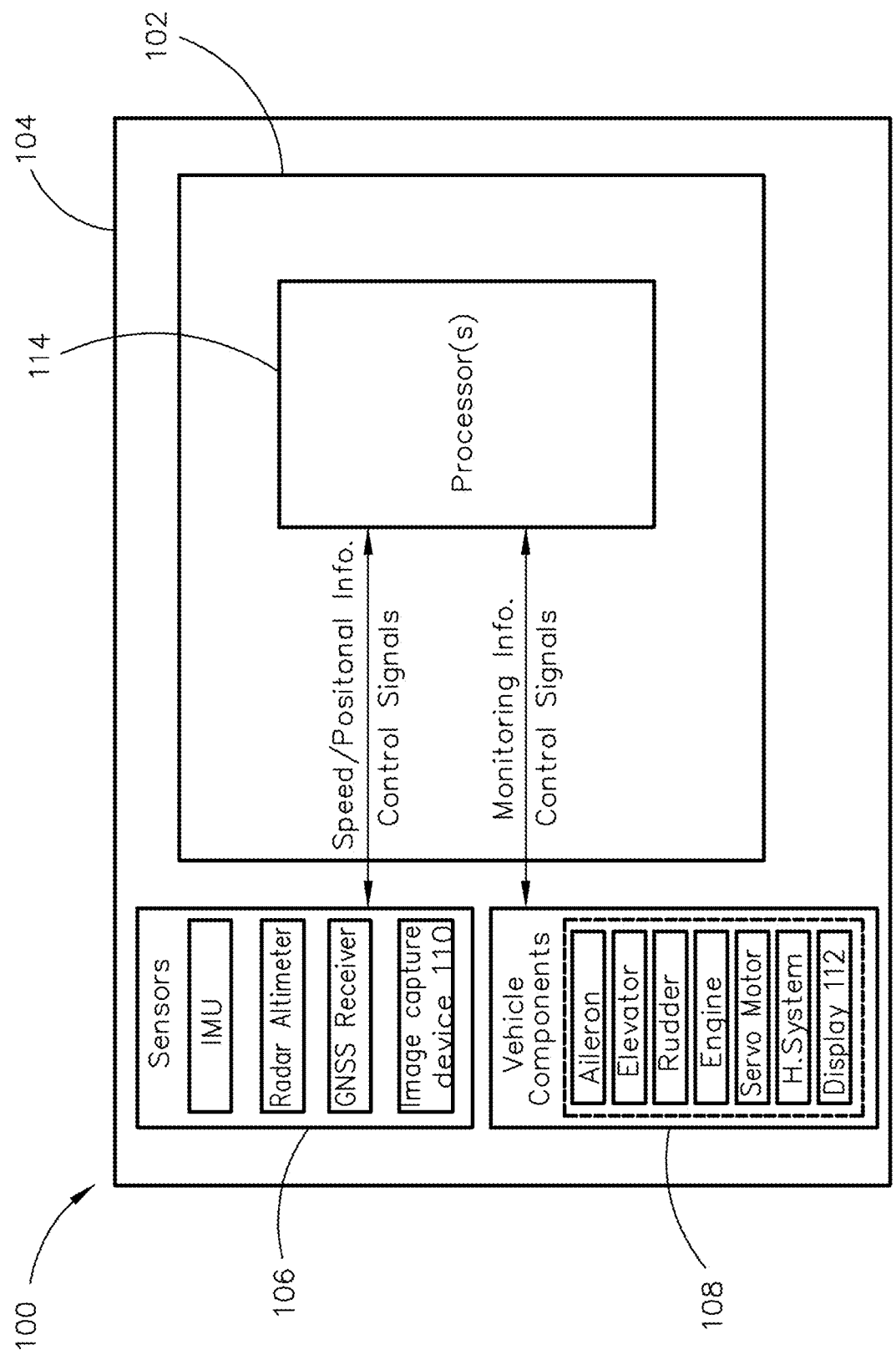
FIG. 1 is a block diagram of an exemplary embodiment of a system for evaluating display accuracy according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

"Eye reference point" as used herein, means an optical reference point, or a spatial position of an eye of an operator of a vehicle relative to an optical axis. This spatial position is sometimes referred to as the Design Eye Position (DEP) because the DEP should be accurate enough such that it is coincident with the eye reference point. The DEP can be considered an optimum location within a cockpit of an aircraft for viewing the outside world and aircraft controls. This spatial position(s) of the eye reference point and the DEP should meet certain standards or guidelines, including federal aviation requirements (e.g., FAR 25.773, 25.777, and also, The Engineering Society for Advancing Mobility Land Sea Air and Space, SAE AS8055 (1999)).

"Eyebox" as used herein, means a three-dimensional (3D) volume in which specific optical performance requirements are met. For example, at any position within the eyebox, a minimum field of vision (FOV) of a display should be visible with at least one eye (e.g., at least monocular FOV of the display is maintained at any point in the eyebox). The eyebox size or dimensions may be optimized to allow maximum operator head movement, while still maintaining display visibility. At a minimum, according to certain requirements (e.g., SAE AS8055), an eyebox should not be smaller than a lateral dimension of 76.2 mm (3.0 in), a vertical dimension of 50.8 mm (2.0 in), and a longitudinal dimension of 101.6 mm (4.0 in).

"Optical infinity" as used herein means a condition when the image distance to the virtual display (e.g., as applied to a HUD) is such that for 95% of all possible look angles and head positions within the eyebox the horizontal parallax is less 3.5 mrad, representing an optical image distance of at least 18 m (59 ft).

"Memory" as used herein, and unless otherwise specified, means any storage medium known in the art suitable for storing program instructions executable by the associated one or more processors and one or more databases. For example, memory may include, but is not limited to, a read-only memory, a random access memory, a magnetic or optical memory device (e.g., disk), a magnetic tape, a solid state drive and the like. The memory includes non-transitory memory. In embodiments, the memory may be located remotely with respect to the system.

"Processor" as used herein means any processing device, including but not limited to, a microprocessor, an application specific integrated circuit (ASIC), a field programmable gate array (FPGA), a central processing unit, an arithmetic logic unit (ALU), a digital signal processor (DSP), or combinations thereof.

"Module," "block" or "sub-block" as used herein means a combination of hardware and software configured to perform one or more steps, processes and/or algorithms of the inventive concepts disclosed herein.

A display used for displaying critical operational data of a vehicle must be accurate, and often incorporates operational and/or system redundancies to ensure maximum safety and reliability. For example, a Primary Flight Display (PFD) may incorporate conformal display technology and may be used together with a Head-Worn Display (HWD), a Helmet-Mounted Display (HMD), or a Head-Up Display (HUD). Information displayed on such displays as well as the displays themselves undergo substantial analysis, systematic evaluation, and testing to ensure maximum safety and reliability.

Accordingly, and broadly speaking, embodiments of the inventive concepts disclosed herein are directed to systems, apparatuses, or methods that use image capture and processing techniques, including frame-wise analysis, together with one or more precisely located image capture devices (e.g., camera) to reduce display error, increase cognitive processing, increase display accuracy, help troubleshoot and diagnose sources of error, and meet and/or exceed increasingly stringent conformal display tolerances and requirements. More specifically, the one or more image capture devices are located within the eyebox of the vehicle. Because video or image capture occurs at the same location the operator obtains optical input to operate the vehicle, discernable display error, including parallax error, may be captured by the image capture device and reported to an associated processor to adjust one or more display characteristics and/or components to reduce or remove the error. For example, the characteristics and/or components adjusted may include optics, combiner, projector, light source, a display angle, focal length, or combinations thereof.

Additionally, calibrating, testing, or evaluating accuracy of a conformal display presents unique challenges as the data that is to be calibrated, tested, or evaluated represents real-time operational characteristics of the vehicle. The inventive concepts disclosed herein address these unique challenges in one respect by changing a vantage point at which certain procedures occur. For example, a vantage point at which these real-time operational characteristics are observed is often outcome determinative of a successful calibration, test, or evaluation procedure.

Embodiments use an image capture device for systematic display evaluation, error reduction, or calibration testing. Other embodiments use the image capture device for emergency condition system redundancy.

Referring now to FIG. 1, an exemplary embodiment of a system 100 for evaluating display accuracy is shown. A system controller 102 is utilized for control, computation, and communication associated with a vehicle 104, including but not limited to, receiving positional and speed information from sensors 106, generating and relaying control signals to controllable vehicle components 108, monitoring the vehicle components 108 and/or the sensors 106, providing corrective adjustment signals to components of an image capture device 110, or providing data or information for presenting one or more notifications on the display 112. For example, monitoring information may include an image or a video stream obtained by the image capture device 110.

In embodiments, the system controller 102 includes one or more processors 114 configured at least for receiving the positional and speed information and generating the control signals. The positional and speed information received may include but is not limited to, information to determine an attitude and/or a heading, operator positional tracking information (e.g., head position or head motion tracker), and information to generate a synthetic relative position vector. The control signals may include but are not limited to, on/off signals, zoom in/out signals, power increments/decrements, gain adjustments, and one or more image processing signals (e.g., filtering, stitching, translating, rotating, registration, or combinations thereof). The corrective adjustment signals to components of the image capture device 110 may result one or more of: adjusting an angle of an exit lens, adjusting a size of a collimating aperture, adjusting a digital output (e.g., using image processing signals, adjusting timing of video signal or blanking interval, adjusting an aspect ratio, adjusting a distance between symbols, or combinations thereof), adjusting a mount position or angle, or combinations thereof. The one or more notifications for the display 112, or for a remote facility in communication with vehicle 104, may include but are not limited to, an alert, a warning, a 'display calibrated' message, and a 'display error detected' message.

In embodiments, the system controller 102 includes one or more communication means (e.g., wires, infrared, Bluetooth, Ethernet, etc.). The one or more vehicle sensors 106 may include a compass, an altimeter (e.g., radar altimeter or a ground tracking radar device), an inertial measurement unit, a fiber optic gyroscope, a bubble level, an accelerometer, a pitot tube, a passive infrared sensor, a positional head-tracking sensor, an optical sensor, a sonic sensor, a Global Navigation Satellite Systems (GNSS) system receiver, an antenna, one or more additional receivers and/or transceivers, or combinations thereof. It is noted that the list above is not exhaustive, for example, the one or more vehicle sensors may also include an Instrument Landing System (ILS), a VHF omnidirectional range (VOR) system, a Ground-Based Augmentation System (GBAS), a Radar Terrain Awareness and Warning System (RTAWS), or combinations thereof. It is further noted that those skilled in the art will recognize other sensors to be included in the one or more sensors 106, which are intended to be encompassed by the inventive concepts disclosed herein.

In embodiments, the adjustable vehicle components 108 include but are not limited to, an aileron, an elevator, a rudder, an engine, a servo motor, a hydraulic system (e.g., hydraulic power pack), and display 112. It is noted that this list is not meant to be exhaustive and those skilled in the art will recognize other adjustable components encompassed by the inventive concepts disclosed herein.

Figure 2:
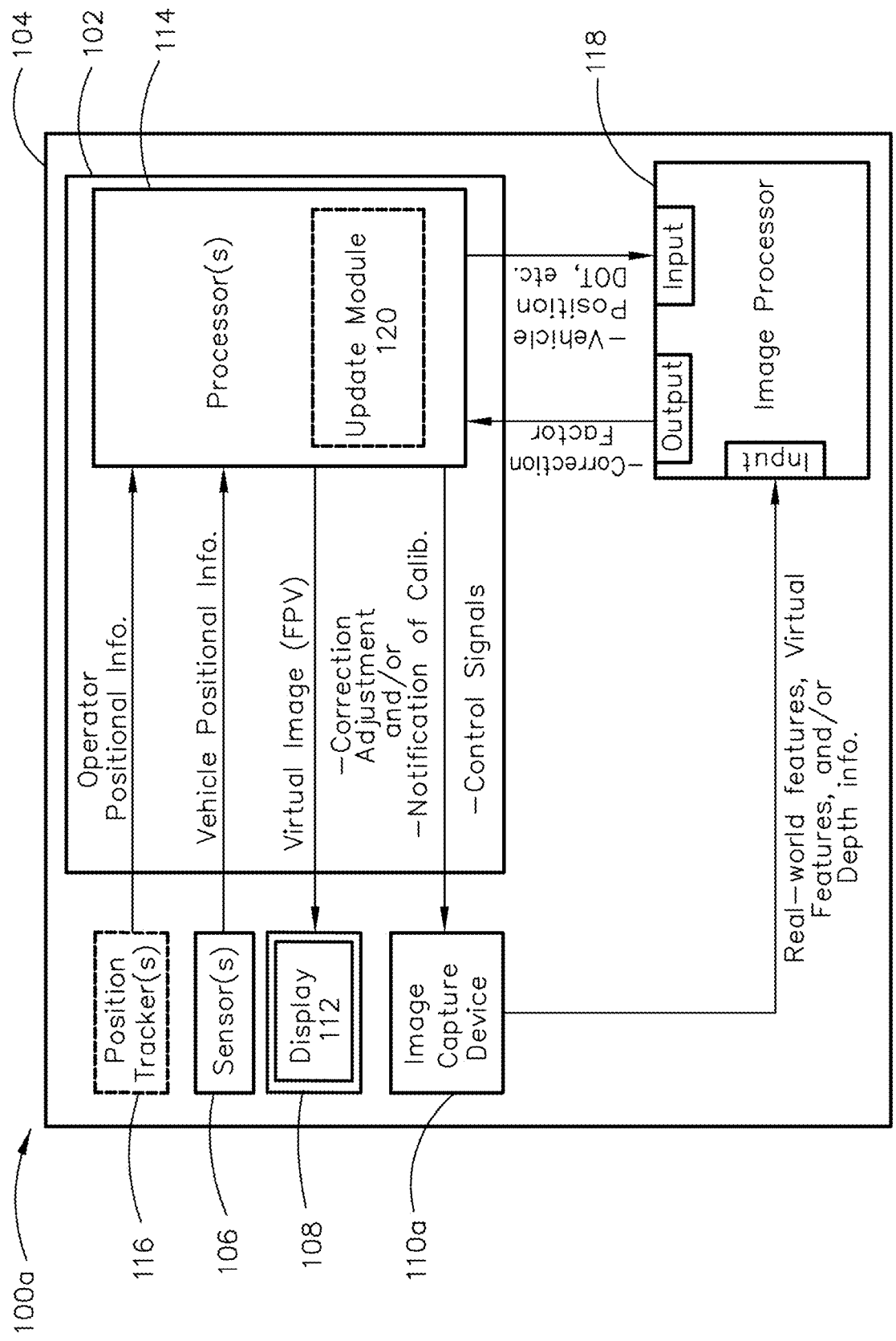
FIG. 2 is a block diagram of an exemplary embodiment of a system for evaluating display accuracy according to the inventive concepts disclosed herein

Referring now to FIG. 2, an exemplary embodiment of a system 100a includes processor 114 communicatively coupled with one or more positional trackers 116 to receive and account for motion within the vehicle. System 100a is implemented similarly to system 100 except that the system 100a may incorporate positional trackers 116, a dedicated processor 118, an image capture device 110a, and an update module 120 (e.g., for updating processor 114 or other components that are not configured to 'talk to' the positional trackers 116, the dedicated processor 118, or the image capture device 110a). It is noted that one or more components of system 100a may be components of a kit (e.g., for retrofitting vehicles). It is further noted that the positional trackers 116 and/or the dedicated processor 118 need not be included together in the same kit, but may be individual components of two or more kits, which may depend on the inclusion of the update module 120 in one or more of the two or more kits.

In some embodiments, the positional trackers 116 may be configured for measuring position and/or orientation information associated with an operator (e.g., head or eye movement) of the vehicle 104. For example, if the operator is using an image capture device 110a attached to visors, goggles, or a HWD, the positional tracking information may be used to remove or combine relative motion within the vehicle (i.e., from operator's head moving) with the relative motion of features without the vehicle 104. It is noted that using the relative motion within the vehicle 104 together with or subtracted from relative motion without may enable a more accurate determination of the relative motion of features located without the vehicle 104. It is further noted that using an image capture device 110a attached to a HWD may help optimize size, weight, and power (SWAP) constraints on the vehicle 104.

In some embodiments, the dedicated image processor hardware 118 is utilized to receive input for processing an image taken of a virtual image (e.g., 146 in FIG. 5, below) presented on display 112. The image of the virtual image will include pixels that correspond to virtual features (e.g., symbols presented on display 112) and pixels that correspond to real-world features (e.g., clouds, buildings, runway, vehicle frame, vehicle window, etc.), where the real-world features may be located within and/or without the vehicle 104. The dedicated image processor 118 is utilized to minimize any latency that may be associated with image processing. It is contemplated, however, that the utilization of dedicated hardware 118 is not required, and image processing may be performed by the processor(s) 114 without departing from the broad scope of the inventive concepts disclosed herein.

In embodiments, the image processor(s) 114 and/or 118 may incorporate algorithms, including but not limited to, a machine vision algorithm, a simultaneous localization and mapping (SLAM) algorithm, a 3D point cloud navigation algorithm, or combinations thereof. The processors 114 and/or 118 may incorporate image processing algorithms, including but not limited to, object recognition, edge detection, segmentation, pixel counting, optical character recognition, pattern recognition, thresholding, filtering, stitching, translating, rotation, registration, or combinations thereof.

Figure 3:
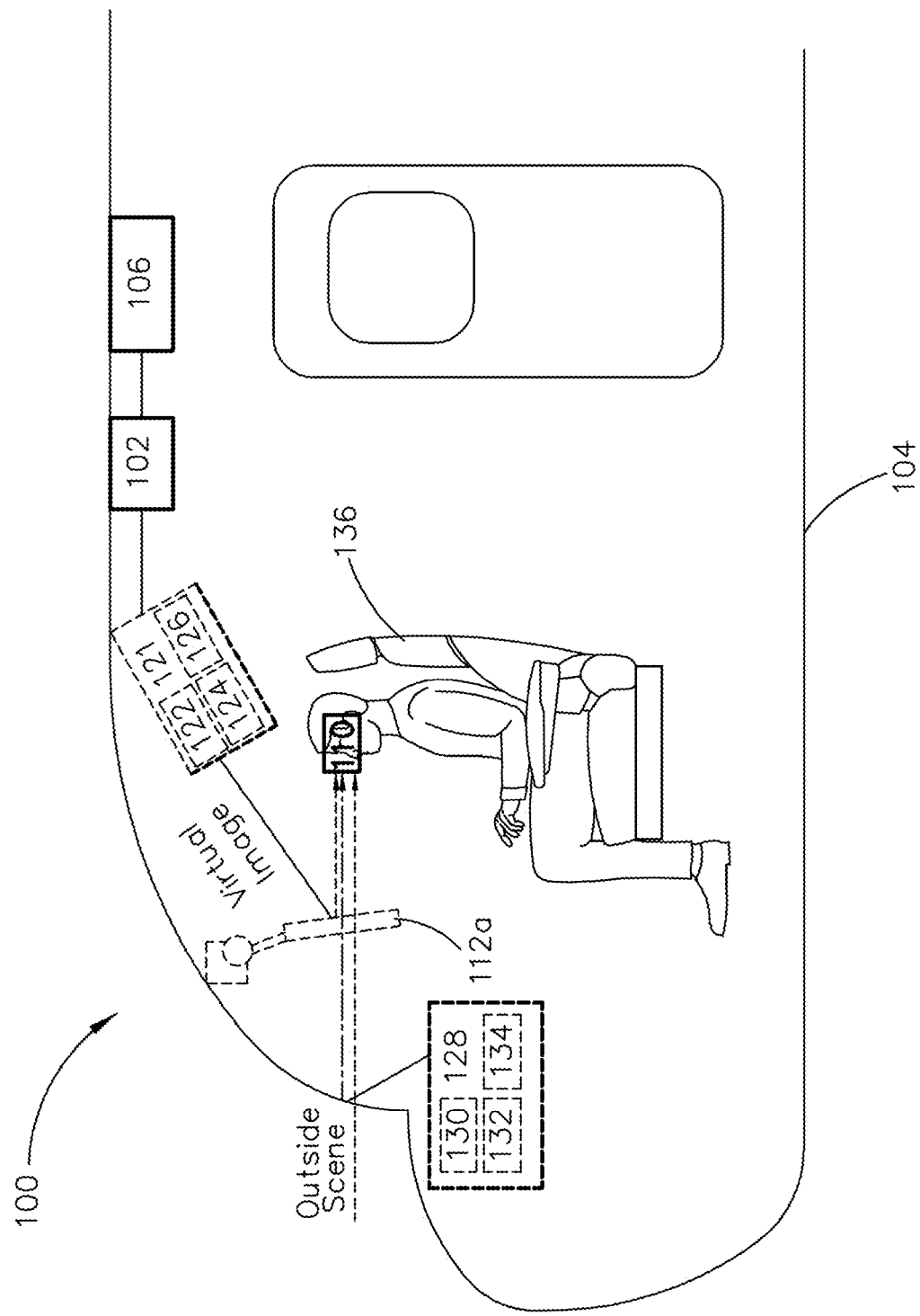
FIG. 3 is a side view of an exemplary embodiment of a vehicle incorporating a system for evaluating a display according to the inventive concepts disclosed herein.

Referring now to FIG. 3, an exemplary embodiment of a display evaluation system 100 according to the inventive concepts disclosed herein includes an image capture device 110, a system controller 102, the one or more vehicle sensors 106, and display 112a. The display 112a is implemented similarly to display 112 except that the display 112a is depicted as a combiner of a HUD (e.g., angled flat piece of glass or combiner with a curved surface).

In embodiments, the image capture device 110 includes one or more cameras, including but not limited to, a digital camera, a time-of-flight camera (e.g., modulated and/or pulsed), a light detection and ranging (LiDAR) camera, stereo vision cameras, a structure light camera, a stereo triangulation camera, a narrow and/or large depth field camera, a transparent camera (e.g., polymer film or luminescent concentrator), or combinations thereof. In embodiments, the image capture device 110 has a pixel resolution above a minimum threshold (e.g., above 8-10 megapixel resolution).

In embodiments the display 112a includes a conformal display. In some embodiments, symbols presented on display 112a are presented at optical infinity. For example, the conformal display 112a may include a HUD, a HWD, or a HMD with symbols presented at optical infinity to aid with calibrating or testing the display 112a, or to aid with portions of a flight path, including but not limited to, critical portions such as take-off and landing.

In embodiments, the display 112a may include a reflective HUD. The reflective HUD may include an overhead unit (OHU) 121. The OHU 121 may include a light source 122 (e.g., CRT, LED, etc.), optics 124 (e.g., relay lens assembly, collimator, etc.), and one or more servomotors 126 for adjusting a position or angle of one or more components of the OHU 121.

In other embodiments, the display 112 may include a refractive HUD with a backlighting system 128. The backlighting system 128 may include a light source 130, optics 132 (e.g., relay lens, folding mirror, exit lens, collimator aperture, etc.), and one or more servo motors 134 for adjusting a position or angle of one or more components of the backlighting system 128.

In other embodiments, the display 112 may include a transparent HUD system. For example the transparent HUD display may include a thin flexible film using transparent conductors based on silver nanowires/OLED or other appropriate technology for creating a transparent display film that can be applied directly to or incorporated into the laminated glass windshield of aircraft or other vehicles.

In embodiments the OHU 121 or the backlighting system 128 is attached or mounted to the vehicle 104 to ensure optimum optical alignment. In embodiments, the vehicle 104 includes, but is not limited to, an aircraft, a water-based vehicle, an automobile, and a military ground vehicle. For example, the OHU 121 may be mounted with respect to a boresight of an aircraft 104 to ensure optimum optical alignment of a virtual image to be conformally presented the display 112.

In embodiments, the image capture device 110 may be mounted to a rotating arm such that the image capture device 110 may be stowed and/or locked into a secure position when not in use. For example, the image capture device 110 may be attached to a rotating arm such that it may rotate to a position behind the OHU 121, avoiding display obscuration, and being configured to stay in the position until an operator removes it from the position. For instance, locks, friction hinges, housing units, or combinations thereof, may be employed to stow the image capture device 110 when not in use.

In other embodiments, the image capture device 110 may be removably attached to the OHU 121 such that after calibration or systematic evaluation of the display 112, the image capture device 110 may be removed from the OHU 121.

In embodiments, the image capture device 110 may be attached to goggles, visors, a HMD, or a HWD. For example, one or more cameras may be attached to a HMD to capture images or video feed of display 112.

In embodiments, the image capture device 110 may be attached to a mount that fits securely to the seat 136 of the vehicle operator. For example, the mount may be secured to a head rest of a chair of the Pilot in Command (PIC).

In some embodiments, the vehicle operator may move their head or entire body while the display evaluation system 100 obtains images of the display 112. For example, during testing or calibration of the display 112, the vehicle 104 may be in motion such that symbology displayed on display 112 is presented as it would be presented to the PIC during normal operation. The image capture device 110 may be moved into position to obtain images or video streams of the symbology on the display 112. Upon obtaining the images or video streams, the image capture device 110 may be removed from the capturing position such that the PIC may resume command. It is noted that a second pilot or autopilot may be used in testing/calibrating situations which require a vehicle operator to move all or a portion of their body.

Figure 4:
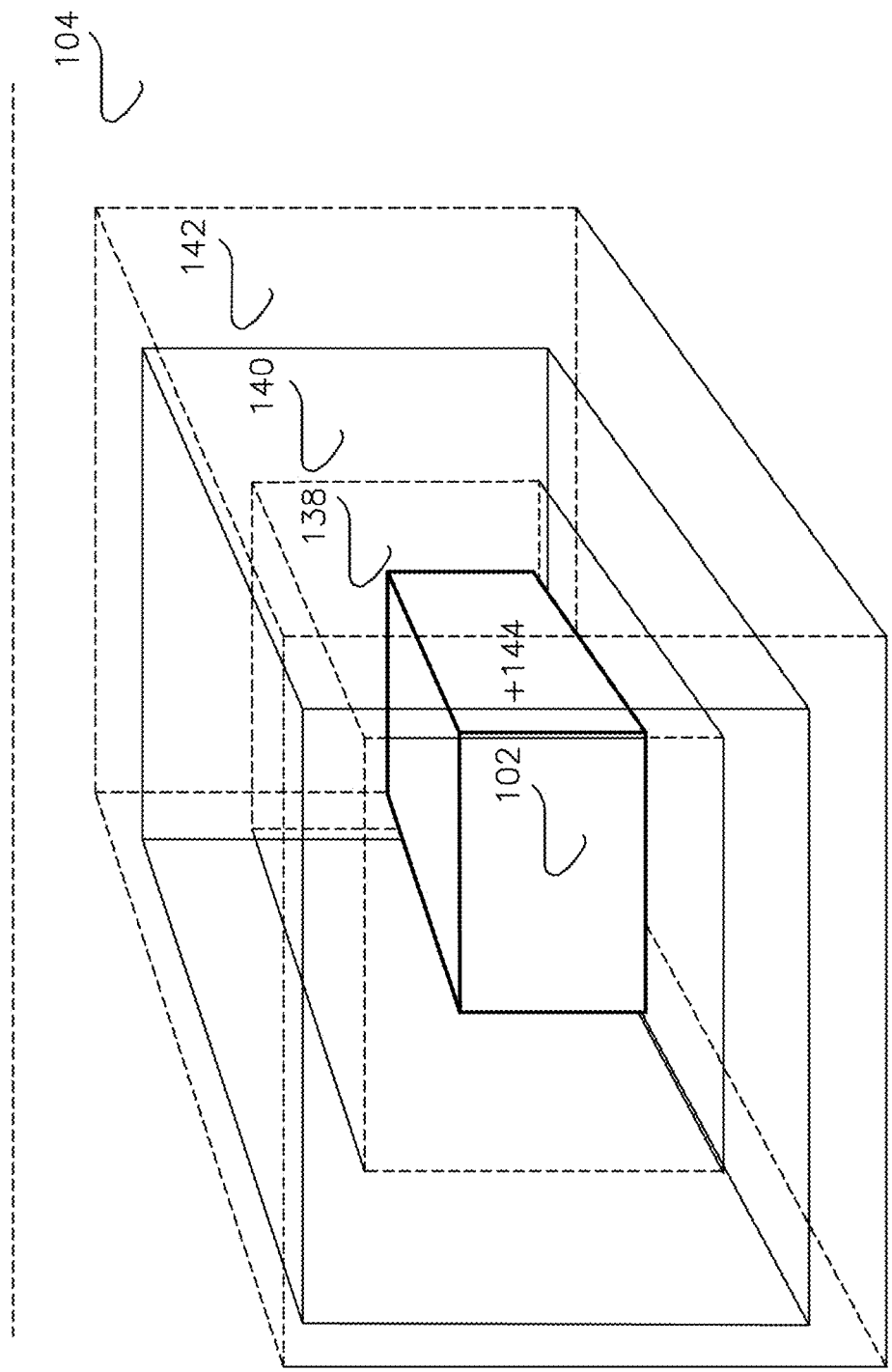
FIG. 4 is a perspective view of an exemplary embodiment of a location of an image capture device according to the inventive concepts disclosed herein.

Referring now to FIG. 4, an exemplary embodiment of the image capture device 110 according to inventive concepts disclosed herein, is located within the vehicle 104 with respect to minimum size or dimension requirements 138 (see definition of "eyebox", above) of an eyebox 140 of the vehicle 104. For example, the image capture device 110 may be located within a typical eyebox 140 (e.g., HUD eyebox) of the vehicle 104. The typical eyebox 140 is slightly larger than the minimum requirements 138, and fits within a number of tolerances 142. For instance, as measured from an eye reference point 144 (e.g., HUD eye reference point), the tolerances 142 include: less than or equal to 5.0 mrad from boresight, less than or equal to 7.5 mrad (2 sigma) from within a 10° (degree) diameter, less than or equal to 10.0 mrad (2 sigma) from within a 30° (degree) diameter, and less than 10 mrad+kr [(FOV)(in degrees)−30)], where kr=0.2 mrad of error per degree of FOV and FOV=field of view in degrees. It is noted that the depiction of tolerances 142 or the eyebox 140 as a three-dimensional cubic volume is not limiting, as other recognizable volumes meeting these parameters are intended to be encompassed herein.

Figure 5:
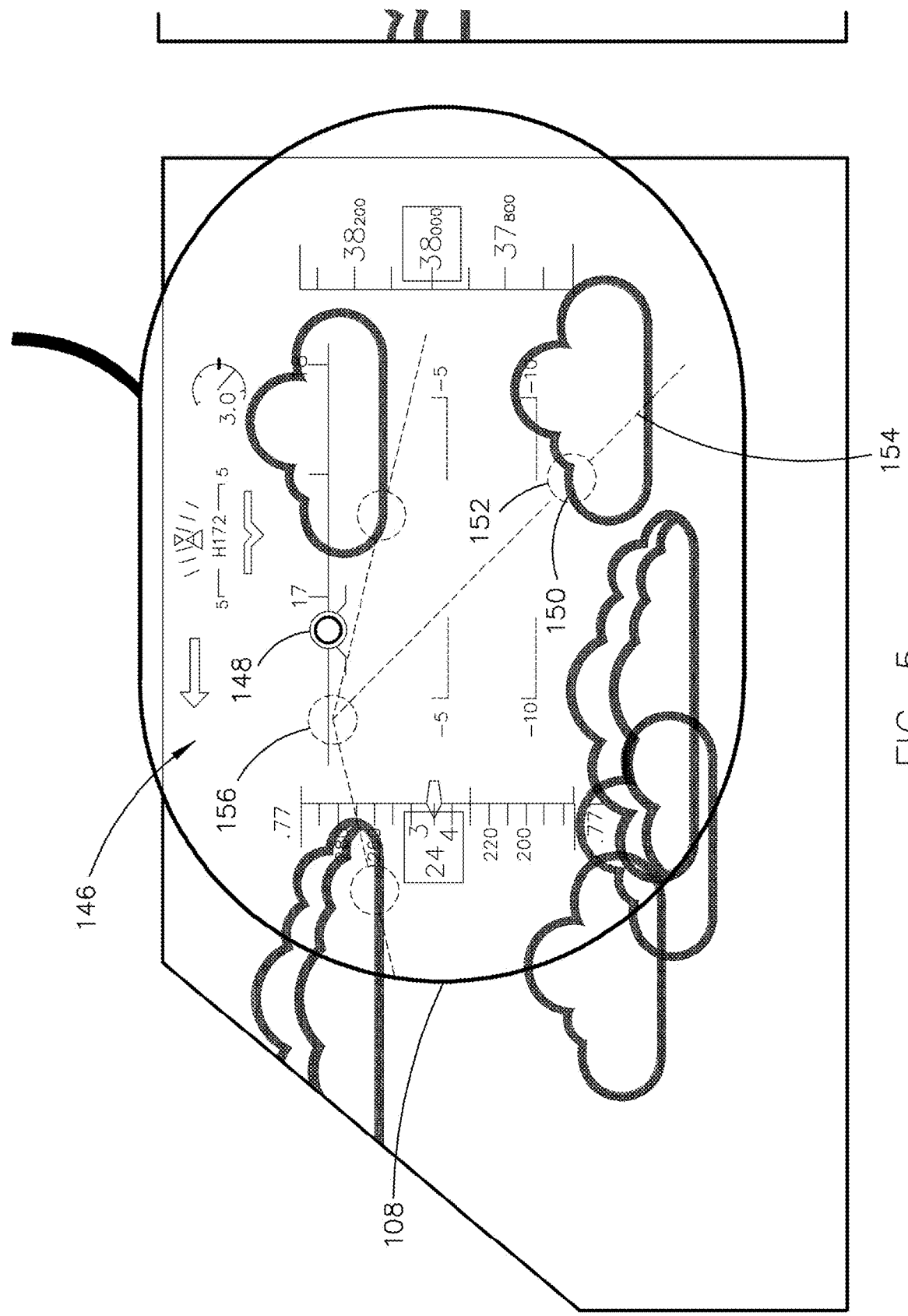
FIG. 5 is an exemplary embodiment of a display according to the inventive concepts disclosed herein.
Figure 6:
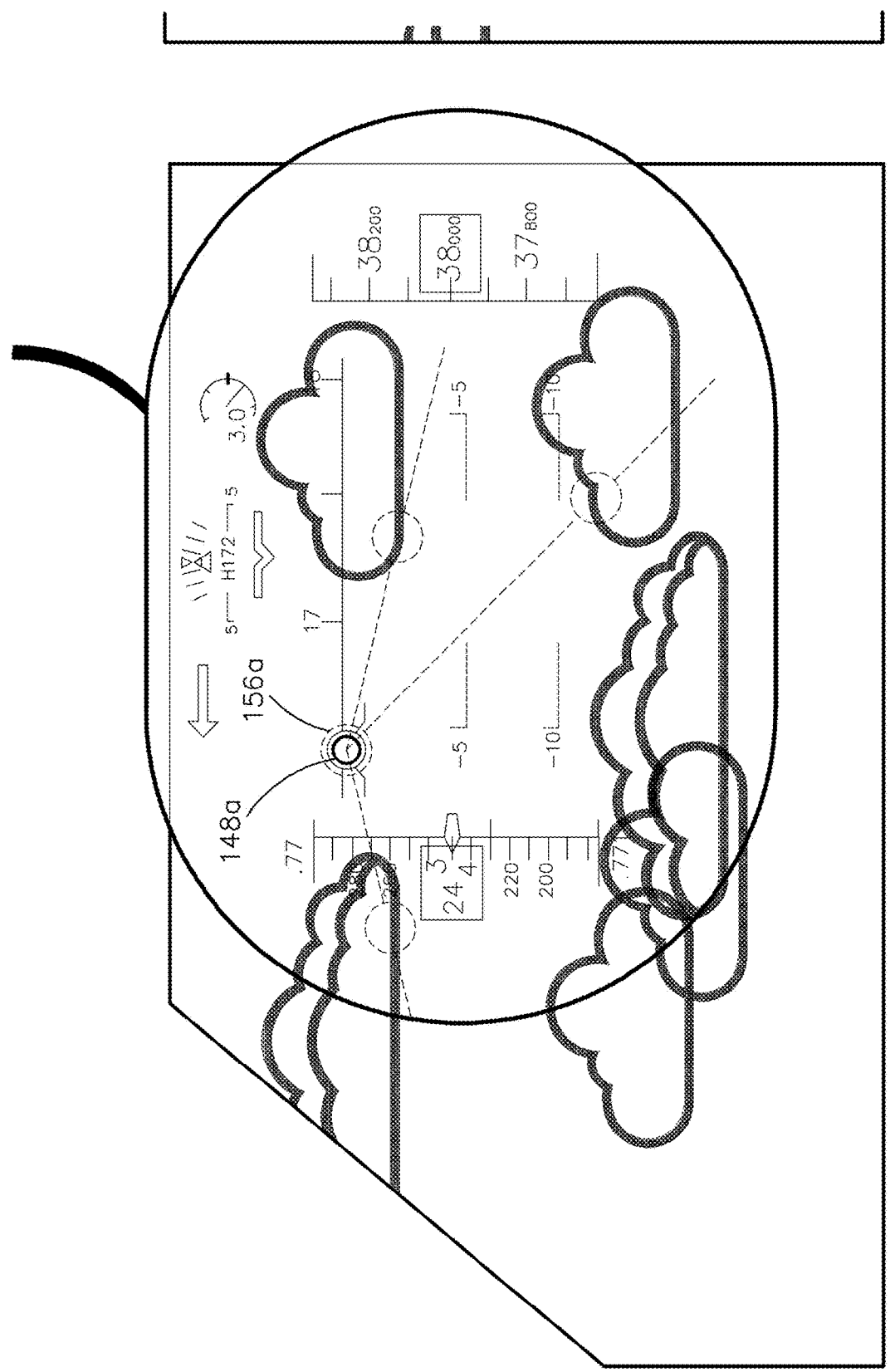
FIG. 6 is an exemplary embodiment of a display according to the inventive concepts disclosed herein.
Figure 7:
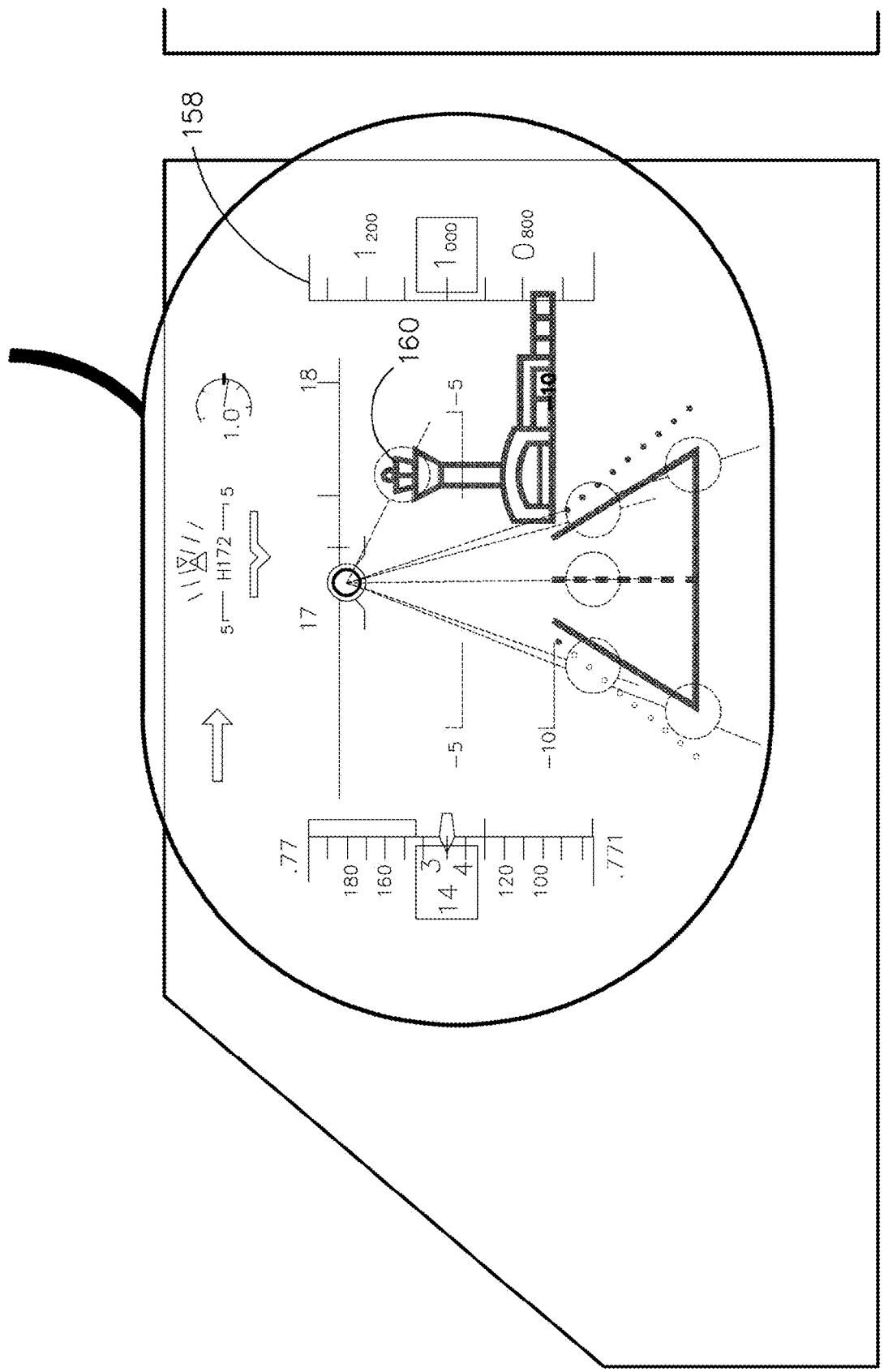
FIG. 7 is an exemplary embodiment of a display according to the inventive concepts disclosed herein.

Referring now to FIGS. 5-7, an exemplary embodiment of an image capture device 110 located within an eyebox 140 is configured to perform automatic, real-time (e.g., in-flight), or manual image and/or video capture. Depicted in FIGS. 5-7 are views or FOV from image capture device 110 that is configured to capture an image or a video stream of conformal display 112a while the vehicle 104 is in operation. The real-time images or video stream(s) include images of a virtual image 146 presented, projected, or displayed on the display 112a together with features of the outside world to which the display 112a conforms. For example, the virtual image 146 may include a specific virtual symbol 148 representing an operational characteristic of the vehicle 104.

For instance, the virtual image 146 may include, but is not limited to, a path vector symbol that represents a direction of travel of a vehicle such as a flight path vector (FPV) symbol, an attitude indicator that indicates an attitude of the vehicle, a compass that indicates a heading of the vehicle, an altimeter tape that represents altitude of an aircraft, an airspeed tape that represents a velocity of the aircraft, or combinations thereof.

In some embodiments, the location of the image capture device 110 does not need to be precise. For example, as long as image capture device 110 is located within eyebox 140 such a location is sufficient. In other embodiments, the image capture device 110 is located within a minimum distance of eye reference point 144. For example, a photographic lens of image capture device 110 may be within a lateral dimension of less than or equal to 76.2 mm, a vertical dimension of less than or equal to 50.8 mm, and a longitudinal dimension of less than or equal to 101.6 mm from the eye reference point 144.

The images or video stream(s) of the virtual image 146 undergo frame-by-frame image processing (e.g., via processor 114 and/or 118) to identify and track pixels of the images or video stream(s) that correspond to the virtual image 146 and pixels that correspond to real-world features 150. Tracking pixels may include tracking separate or individual groups of pixels. For example, a first group of pixels may correspond to the virtual symbol 148. By way of another example, a second group of pixels 152 may correspond to real-world features 150, including but not limited to, separate or individual views, scenes, or environment of the outside world, and views, scenes, or environment within the vehicle. For instance, real-world features of views, scenes, or environment of the outside world may include, but are not limited to, separate or individual clouds, buildings, landmarks, a runway, or combinations thereof; whereas, separate or individual views, scenes, or environment within the vehicle may include, but are not limited to, views of a combiner position relative to other components like the frame or windows of the vehicle, the frame or windows of the vehicle, angle of curvature of a combiner as currently positioned, display angle, spatial depth of a display, spatial depth of the combiner, a control panel, a yoke, a HDD, or combinations thereof. In this regard, once the virtual image features and/or symbols 148 are captured from a FOV (e.g., FIG. 4) of the image capture device 110, including real-world features 150, the real-world features 150 are computationally distinguished from the virtual image features/symbols 148. The distinction may occur from image processor 118 being configured to identify pixels corresponding to each type of feature (e.g., real-world vs. virtual), for example, based on color (e.g., some HUD displays use a distinctive blue or green color), depth information (e.g., greater depth associated with features outside the vehicle than features located within the vehicle), surrounding environment, intensity, or combinations thereof. Once distinguished and identified, the image processor 118 is enabled to track the pixels 152 associated with real-world features located outside the vehicle over at least two different image frames.

Because one or more groups of pixels 152 correspond to real-world features captured real-time, useful characteristics associated with these pixels as the pixels are tracked from frame-to-frame are identified. For example, as the pixels 152 are tracked the useful characteristics identified may include, but are not limited to, two-dimensional (2D) movement, 3D movement based on the depth information, diminishing or increasing pixel intensity (e.g., which may help to indicate proximity to real-world features), or combinations thereof. After identification, the characteristic(s) may be used to obtain one or more advantages of the inventive concepts disclosed herein. For example, if movement is measured as a group of pixels 152 is tracked, the movement may computationally result in an associated motion vector 154. The associated motion vector 154 includes a direction. Multiple groups of pixels (e.g., two or more) may be tracked and the direction of their motion vectors propagated to determine a convergence point 156 of the multiple motion vectors. If the image or video stream(s) are of a virtual symbol visually depicting a direction of travel (e.g., FPV symbol), then the convergence point 156 of the multiple vectors may be compared to a characteristic (e.g., presented location, presented value, etc.) of the symbol 148 to determine error. For instance, the error determination may occur if symbol 148 is offset from the convergence point 156. If there is offset, then the error associated with the placement of the symbol 148 may be corrected by computing and relaying a correction factor (e.g., see FIG. 2). If the characteristic of the symbol 148 is location or placement on display 112, then the correction factor may include a translation to the presentation of the virtual image 146. If the characteristic of the symbol 148 is a value of the symbol (e.g., speed), then the correction factor may be an adjustment to the value presented or the sensors 106 contributing to that value.

It is noted that FIG. 5 depicts a symbol 148 that requires adjustment to reduce and/or remove display error; whereas FIG. 6 depicts a symbol 148a that is aligned with convergence point 156a. Symbol 148a may be implemented and function similarly to symbol 148, except that symbol 148a may be more accurately placed after the one or more components of system 100 receive the correction factor or receive corrective adjustment. It is further noted that such an aligned display may cause the processor (114 or 118) to generate a notification (e.g., 'display calibrated' or 'no display error'). In embodiments, the notification may be temporarily displayed and/or quickly removed to reduce or minimize display obstruction.

It is noted that in some embodiments the circles indicating a group of pixels 152 and the dashed lines representing a motion vector 154 are representative of algorithms taking place in the processor (114 or 118) and are not actually presented for display on display 112. In this regard, maximum visibility of display 112 and real-world features 150 is maintained. In other embodiments, one or more of the motion vectors 154 may be presented on the display in order to generate a synthetic vector (e.g., for emergency situations, such as when GNSS receiver or other more accurate system is inoperable or unavailable).

With advancements in 3D technology, in some embodiments, system 100 disclosed herein may incorporate a 3D camera for capturing 3D information along with the real-world features and corresponding pixels. For example, the image capture device 110 may include a 3D camera. By way of another example, a position tracker 116 may incorporate a 3D camera. In this regard, it is noted that the position tracker(s) 116 may or may not be attached to an operators head or a HWD. For instance, the position tracker(s) 116 may include a camera mounted within the cockpit of an aircraft 104 to obtain images and track movement of an operators head or eyes. In some embodiments, system 100 may incorporate two or more cameras for capturing 3D information. The 3D information may include depth information, which if tracked, may be utilized to determine proximity to a real-world object within the vehicle 104 (e.g., operator's head) or to a real-world object without the vehicle 104 (e.g., building). In embodiments, the two or more cameras may be positioned according to an average inter-pupillary distance (e.g., 60-70 mm) between the cameras.

In embodiments, the image capture device 110 may be used to create a synthetic vector (e.g., including heading and/or an estimated speed). For example, in an emergency situation, where primary sensors have been damaged or are malfunctioning, the image capture device 110 may conduct a frame-by-frame analysis of relative motion of outside features (e.g., 150) to determine at least a synthetic path vector. In these embodiments, the system controller 102 may be configured to evaluate a level of accuracy of any system or sub-system associated with vehicle 104 and capable of producing a synthetic vector. Based on the level of accuracy, the system controller may perform a prioritization such that the most accurate synthetic vector is used. For instance, if the building is an airport tower with a known position that is stored in memory associated with system 100, and the depth information or a relative motion associated with the building as viewed from image capture device 110 is tracked over two or more image frames, then a heading and/or a speed of the aircraft relative to the building may be computed and used in determining the synthetic path vector of vehicle 104.

In embodiments, the image capture device 110 may be associated with memory in order to retrieve a nominal pattern from the memory and project the nominal pattern on a combiner in order to calibrate display 112. For example, the nominal pattern may comprise a grid that is projected onto a combiner. The image capture device 110 may capture an image of the grid and determine whether the combiner is properly located (e.g., proper off-axis angle) based on curvature or non-existent curvature of the presented grid. If the combiner is not properly located, a notification may be sent to be presented on the display 112 including directional adjustments and instructions for performing them. In this way, mounting or calibrating the combiner may be simplified. It is noted that during real-time operation, the image of the virtual image 146 usually includes symbology as seen by an operator of the vehicle 104 (e.g., HUD symbology). In embodiments, this symbology may be incorporated into a nominal pattern.

Figure 8:
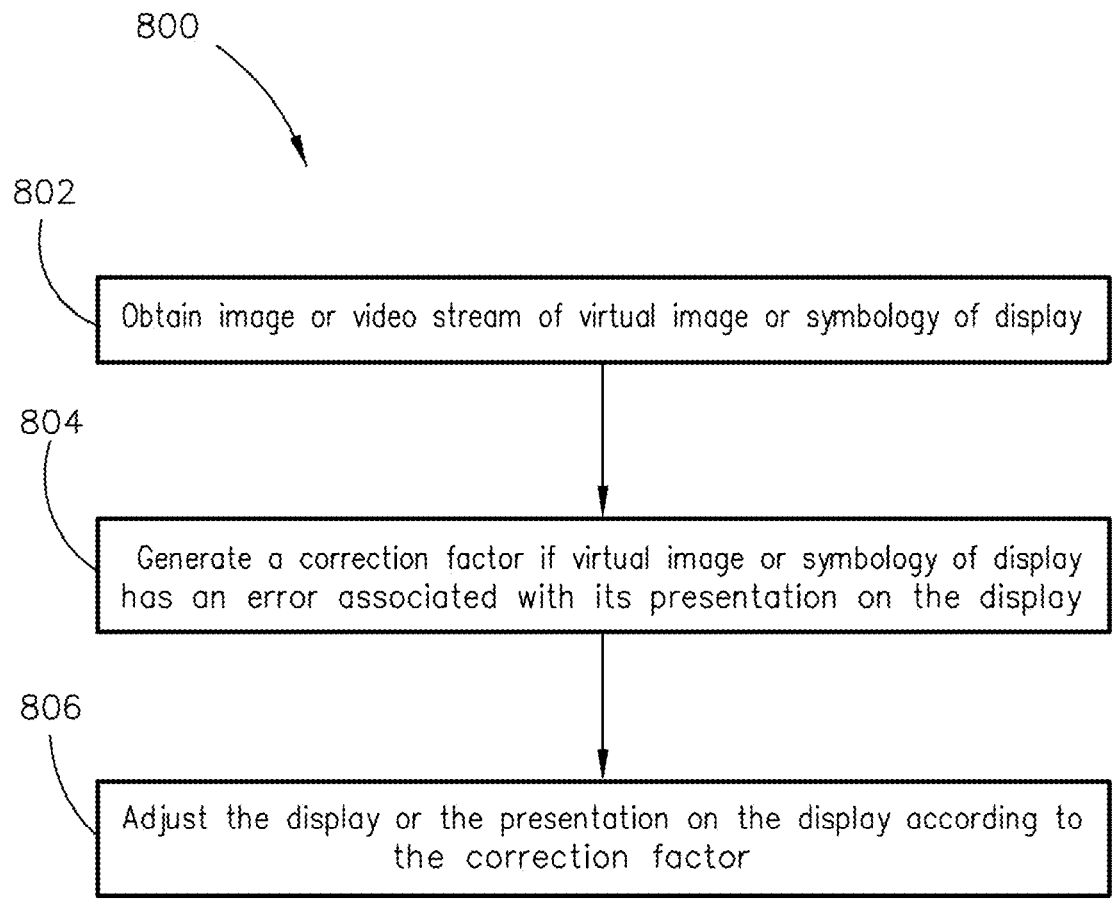
FIG. 8 is an exemplary embodiment of a method according to the inventive concepts disclosed herein.
Figure 9:
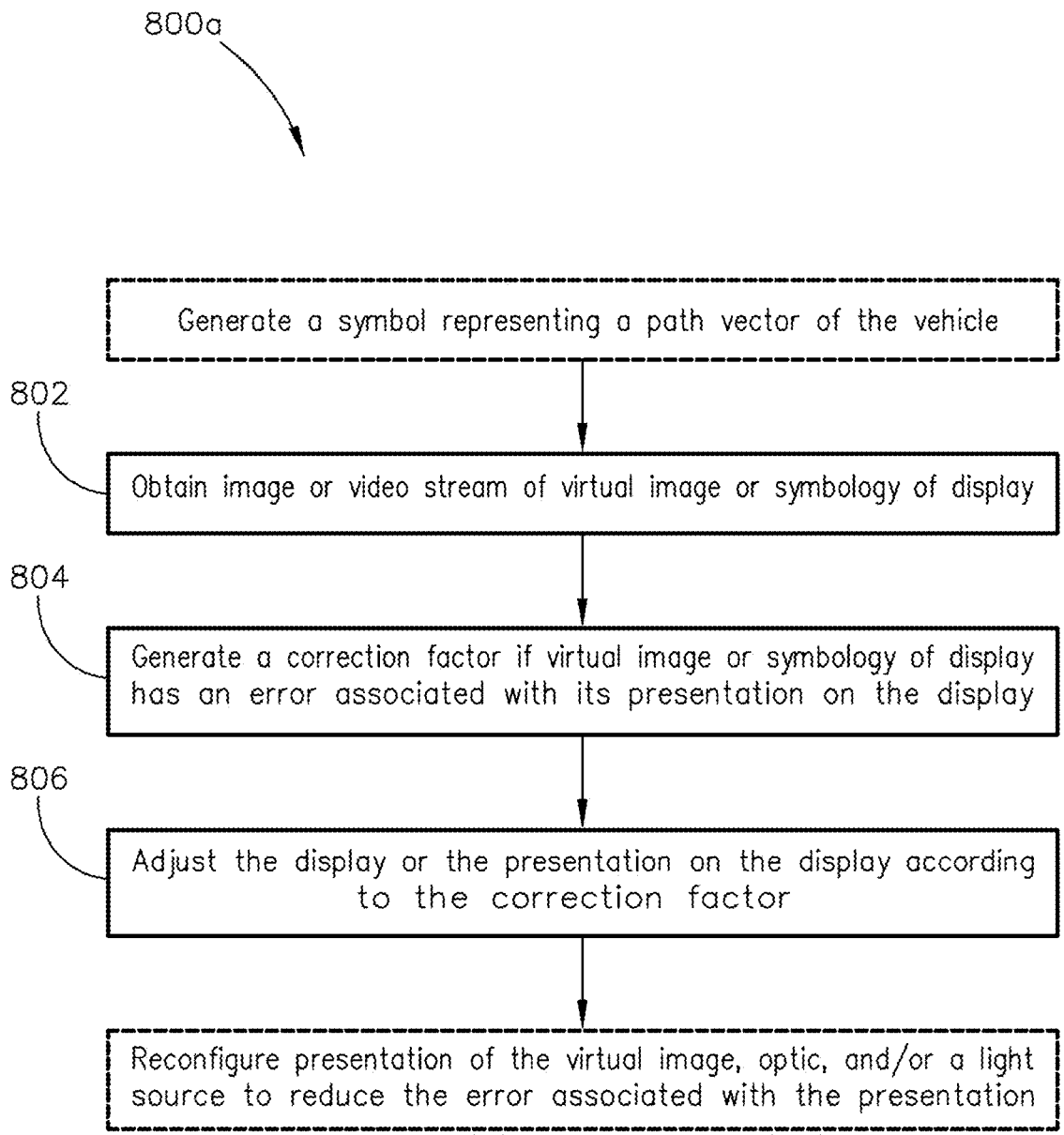
FIG. 9 is an exemplary embodiment of a method according to the inventive concepts disclosed herein.

Referring now to FIGS. 8-9 an exemplary embodiment of a method 800 for evaluating display accuracy may include step 802. The step 802 includes obtaining an image or a video stream of a virtual image 146 or symbology presented on display 112. For example, the symbol 148 may be presented or projected, via emission of light, reflection, refraction, collimation, combining, or combinations thereof.

In embodiments, the method 800 may include step 804. The step 804 includes generating a correction factor if the virtual image 146 or a symbol 148 associated with the virtual image 146 of display 112 has an error associated with the presentation of the virtual image 146 or the symbol 148. For example, using an image processing algorithm, such as object recognition, each digital frame of video captured by image capture device 110 may be analyzed to detect real-world features such as edges of buildings in the scene in a first frame. This detection could be through greyscale matching, gradient matching, or other object recognition techniques. Upon analyzing the frames of the digital video feed one or more frames later, if the edges of the buildings are determined to be in a different location, then the algorithm may determine which edges in the first frame belong to the edges detected at the different location in a second frame, the second frame being one or more frames later than the first. The difference in pixel location between edges in the first frame and corresponding edges in the second frame provides a direction for a motion vector 154 associated with the edges (or any real-world feature). If one or more additional real-world features are tracked simultaneous with the edges being tracked over the first and second frames, then directions for each feature tracked may be used to determine a single convergence point 156. For instance, the single convergence point 156 may represent an instantaneous direction of travel of an aircraft 104.

The determination of convergence point 156 may be based on the intersection of lines, which may be calculated as points on the lines are defined according to HUD coordinates (e.g., according to Euclidean geometry). Because the motion vectors 154 are in the same plane, intersection of two or more motion vectors 154 may be determined by:

$$MV1 \rightarrow y=ax+c$$

$$MV2 \rightarrow y=bx+d$$

where at a point of intersection, the y-coordinates will be the same, giving $$ax+c=d-c, \text{ or}$$

$$x = \frac{d-c}{a-b}$$

using the value of x, and substitution of that value into an equation representing a motion vector (e.g., MV1), we get $$y = a\frac{d-c}{a-b}+c$$

Once the coordinates of the convergence point 156 are found, these can be compared to the HUD coordinates of the FPV symbol 148 to determine an offset. The correction factor can then be determined based on the offset.

It is noted that during a calibration procedure where the correction factor is found as indicated above, the aircraft 104 will maintain a steady (e.g., unchanging) direction of travel. In some embodiments, this is done through the use of an autopilot.

In embodiments, the method 800 may include step 806. The step 806 includes adjusting the display 112 or the presentation of the display 112 according to the correction factor.

Referring now to FIG. 9, the method 800a may function similarly to the method 800, except that method 800a may include one or more additional steps or sub-steps associated with the steps 806, 808, and 810. For example, in some embodiments the method 800 may include a step or a sub-step for generating a symbol (e.g., symbol 148), the symbol representing a path vector of the vehicle. This step or sub-step may also include presenting the symbol on the display 112. By way of another example, the method may include a step or a sub-step for reconfiguring the presentation of the virtual image 146 or of the symbol 148. This reconfiguring step or sub-step may include reconfiguring digital data associated with presenting the virtual image 146 or the symbol 148, reconfiguring display optics 124 or 132 (e.g., relay lens, collimating aperture, etc.), and/or reconfiguring the light source 122 or 130. For instance, a focal length of a lens or a scale factor of the display may be adjusted.

Figure 10A:
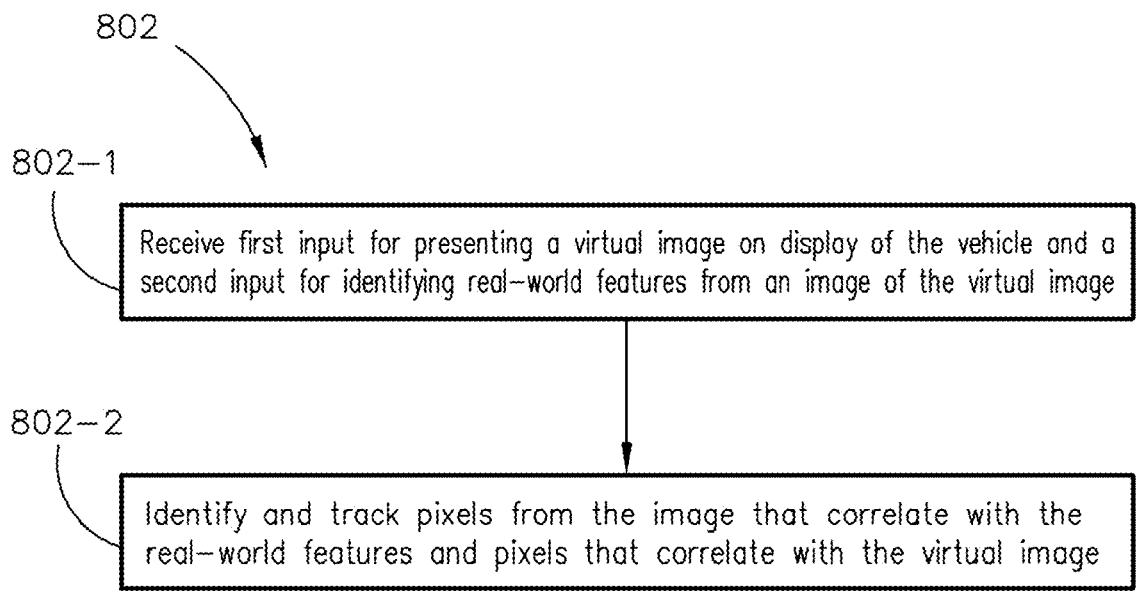
FIGS. 10A-10B are exemplary embodiments of steps or sub-steps of the method of FIG. 8 according to the inventive concepts disclosed herein.
Figure 10B:
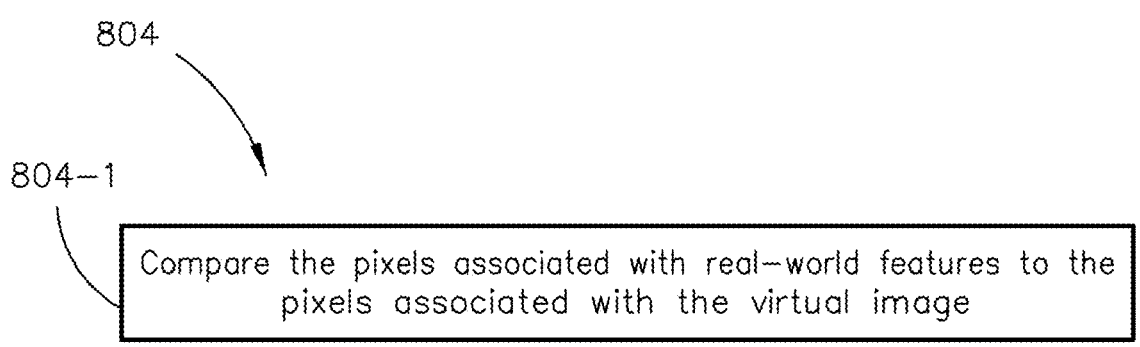

Referring now to FIG. 10A-10B, the steps of the method 800 or 800a may include one or more sub-steps. For example, step 802 may include sub-step 802-1. Sub-step 802-1 includes receiving a first input for presenting the virtual image 146 on the display 112 and a second input for identifying real-world features 150 from an image of the virtual image 146. The first input may include input from sensors 106, including an attitude and/or a heading of the vehicle. The second input may include the image or a video stream of the virtual image 146. By way of another example, the step 802 may include sub-step 802-2. Sub-step 802-2 includes identifying pixels from the image that correlate with the real-world features (e.g., observed natural features) and pixels that correlate with the virtual image 146 (e.g., observed computed features). Sub-step 802-2 may also include distinguishing the pixels of the real-world features 150 from the pixels of the virtual image 146. This distinction may be based on color, intensity, position, depth information, or combinations thereof. For instance, an 8-bit scheme, assigning gray-scale pixel values from 0 to 255 may be used to distinguish features; however, this scheme is not meant to be limiting as a 8-bit, 24-bit, or 32-bit RGB color scheme could also be used. It is noted that a person skilled in the art will recognize that different pixel schemes, including color quantization, color maps, or weighted combinations are intended to be encompassed by the inventive concepts disclosed herein.

In embodiments, Sub-step 802-2 may also include tracking the pixels associated with the real-world features (e.g., 150 or 160). In some embodiments, tracking may also include removing or combining relative movement within the vehicle with relative motion associated with features outside the vehicle in order to more accurately determine the relative motion of the features outside the vehicle.

By way of another example, the step 804 may include sub-step 804-1. Sub-step 804-1 includes comparing the pixels 152 associated with the real-world features 150 (e.g., observed characteristic) to the pixels associated with the virtual image 146 (e.g., computed characteristic). During this comparing of sub-step 804-1, an analysis is made as to whether the symbol 148 is accurately displayed. For instance, if the symbol 148 is a FPV symbol and motion associated with outside features indicates that the motion of the aircraft 104 indicates an offset between convergence point 156 and FPV symbol 148, then the symbol 148 is inaccurately displayed and requires corrective action.

Figure 11:
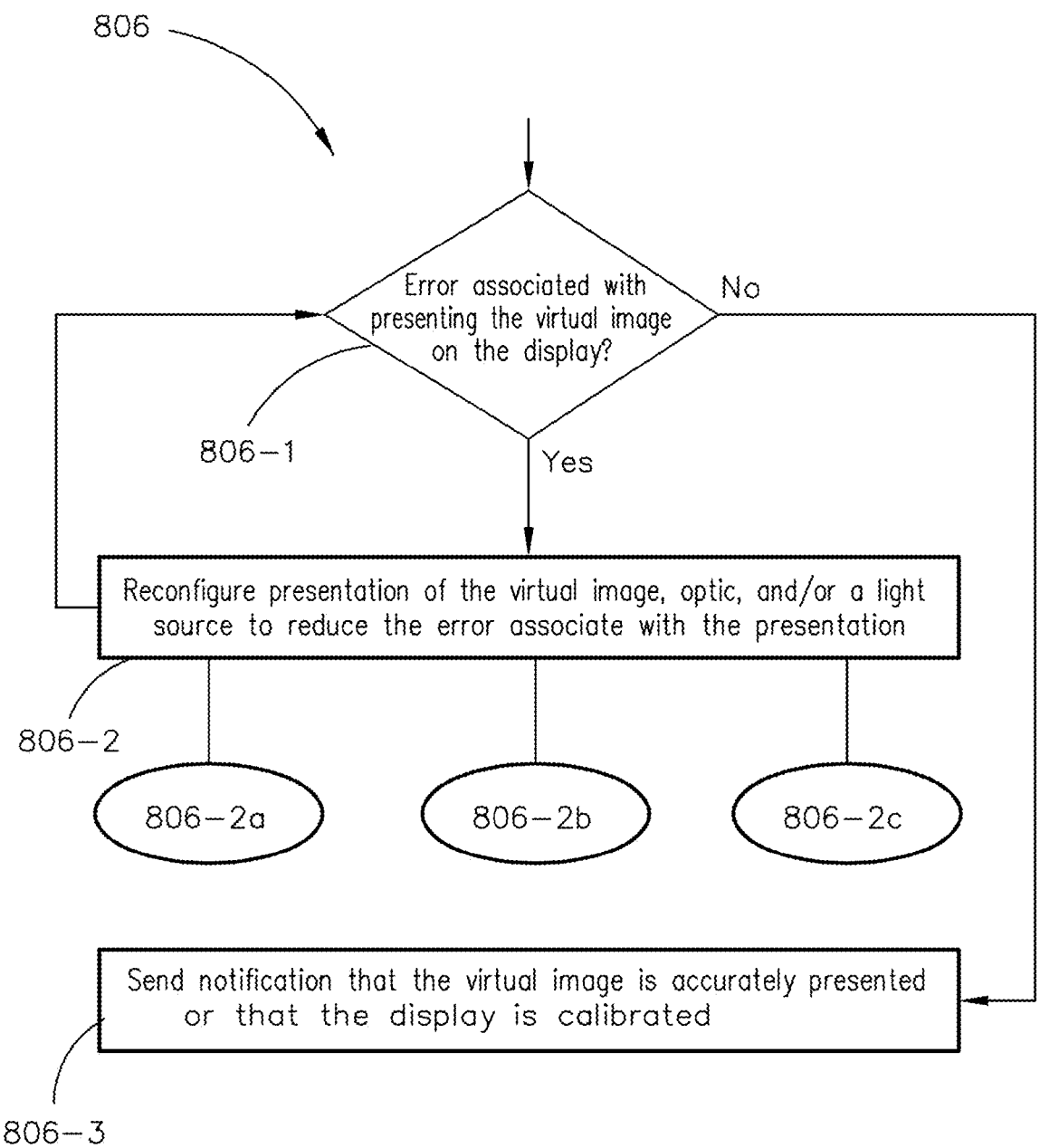
FIG. 11 is an exemplary embodiment of steps or sub-steps of the method of FIG. 8 according to the inventive concepts disclosed herein.

Referring now to FIG. 11, the steps of the method 800 or 800a may include one or more sub-steps. For example, step 806 may include sub-step 806-1. Sub-step 806-1 includes determining whether error is associated with presenting the virtual image 146 or with presenting the virtual symbol 148 on the display 112. This determination is made based on the comparison of sub-step 804-1. If error is associated with the presentation, then at sub-step 806-2, the processor 114 or 118 uses the correction factor of step 804 to reconfigure (e.g., sub-step 806-2) or reposition (e.g., via translation, rotation, etc.) the presentation of the virtual image 146 or of the virtual symbol 148. In this regard, the correction factor may be communicated to a component (e.g., display 112, optics 124 or 132, and/or servo motor 126 or 134) to perform a correctional adjustment according to the correction factor (see FIG. 2), which results in adjustment to the component (e.g., servo motor positional adjustment or a digital image adjustment such as adjusting a display scale factor). The determination can again be made as to whether or not there is any display error associated with the presentation of the virtual image 146 on display 112. If no display error exists, or no display error is discernable by image capture device 110, then at step 806-3 a notification is sent either to display 112 or to a remote facility tasked with keeping track of display testing and/or calibration, to indicate that the virtual image 146 or symbol 148 is accurately presented or that the display 112 is calibrated.

Figure 12A:
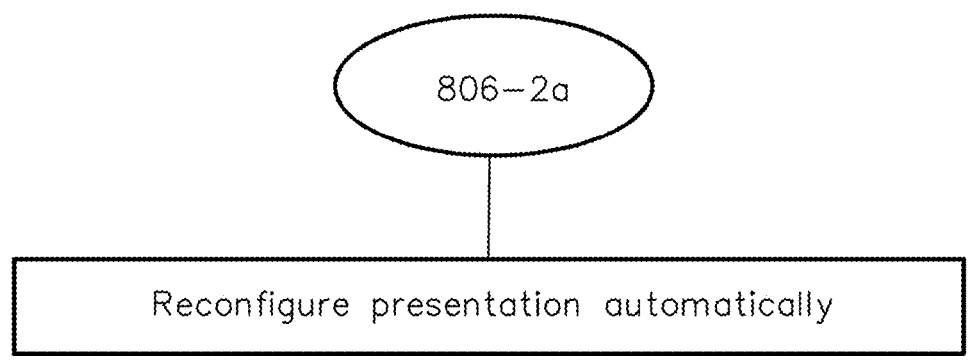
FIG. 12A-12C are exemplary embodiments of steps or sub-steps of the method of FIG. 8 according to the inventive concepts disclosed herein.
Figure 12B:
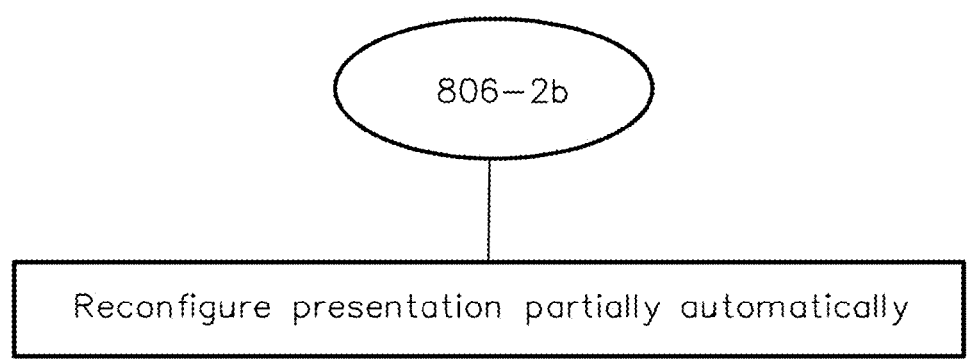
Figure 12C:
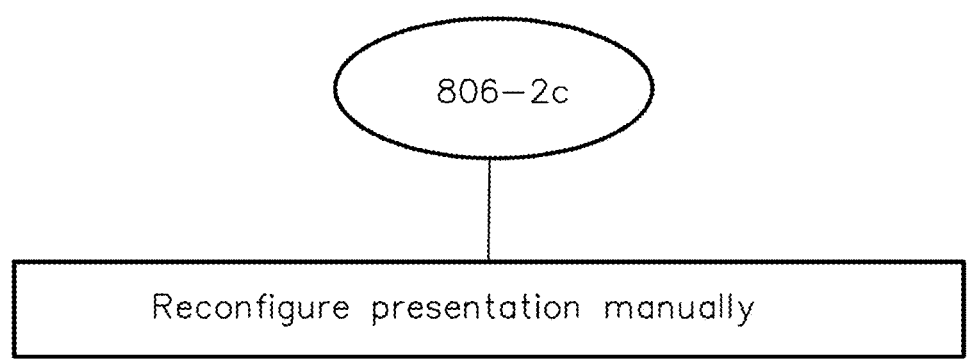

Referring now to FIGS. 12A-12C, the sub-step 806-2 may occur at different times or in different manners, depending on when the image of virtual image 146 is obtained or depending on how system 100 is configured. For example, sub-step 806-2a indicates that the reconfiguration of the display may occur internally and automatically utilizing the one or more processors 114 or 118. In this regard, a timing and configuration that may result in the internal/automatic reconfiguration at step 806-2a may include image capture during real-time via an image capture device 110 attached to goggles, a visor, an HMD, or an HWD. For instance, the processor 118 may be configured to detect the configuration of the system 100 (e.g., type of image capture device 110 plugged in), detect a portion or leg of a flight path (e.g., in-flight, landing, takeoff, etc.), detect the presence of display error, determine the correction factor, and send this correction factor to processor 114. Processor 114 may be configured to convert the correction factor into one or more correctional adjustments, including but not limited to, a digital adjustment to information sent to light source 122 (e.g., LEDs or CRT) for repositioning a presentation the virtual image 146 or symbol 148 on display 112a, a positional adjustment sent to servo motor 126 for adjusting an angle at which the OHU 121 emits the light from the light source 122, a digital adjustment with respect to contents of the presentation on display 112 (e.g., adjust absolute, fixed, relative, or static positions of symbology), or combinations thereof.

By way of another example, the sub-step 806-2b indicates that the correction factor may be input by the processor 114 or 118 at least partially automatically. A configuration and timing that may result the at least partial automatic reconfiguration may be similar to the configuration and timing resulting in automatic reconfiguration in sub-step 806-2a except that the system 100 may include, incorporate, or be in communication with speech recognition technology, such that a command (e.g., voice command, haptic input, combinational input such as eye tracking and voice, or combinations thereof) may be issued to authorize the reconfiguration of the presentation on display 112. For instance, image capture device 110 may be mounted on a HWD such that the image of the virtual image 146 is obtained real-time and error adjusted partially automatically (e.g., after receipt of the authorizing voice command), to reconfigure the display 112 or components associated with the presentation on display 112.

By way of another example, the sub-step 810-2c indicates that the reconfiguration of the presentation on display 112 may occur manually. A configuration and timing that may result in the manual reconfiguration may include during an initial use of display 112, during a display evaluation, or during a display calibration procedure, where the image capture device may be mounted or worn, but is preferably mounted. For instance, reconfiguration adjustments according to the correction factor may occur during testing or calibration of the display 112. In this regard, the display 112 or a processor of system 100 may be in communication with a user input device (e.g., tablet, smart phone, or hand-held device), allowing an operator to receive and display adjustment notifications on the user input device. The adjustment notifications may include instructions for manually or electronically adjusting components of the system 100 to reconfigure the presentation of symbology on display 112.

It is noted that all or a portion of steps of methods 800 or 800*a* may be performed on a flight management system (FMS). It is further noted that all or a portion of system 100 or 100*a* may be incorporated with, or configured to communicate with, the FMS and/or a control display unit (CDU).

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A method for evaluating display accuracy, comprising:
   receiving a first input for presenting a virtual image on a display of a vehicle and a second input for identifying real-world features from an image of the virtual image;
   obtaining the image of the virtual image presented on the display in flight via a stereo camera disposed on a rotating arm mounted to an overhead unit and positionable within an eyebox associated with a head-up display but outside an eye reference point within the eyebox;
   analyzing the image by identifying pixels corresponding to a virtual symbol and pixels corresponding to the real-world features, calculate a convergence point, and identify an offset between the pixels corresponding to the real-world features and the convergence point;
   determining if the virtual image of the display has an error associated with the presentation on the display based on the analysis of the image;
   when an error is identified, determining if the error is associated with presenting the virtual image or if the error is associated with presenting the virtual symbol;
   generating a correction factor to a servo motor associated with the overhead unit; and
   adjusting the display or a component associated with the presentation of the virtual image on the display to at least one of: reduce the error and calibrate the display.

2. The method of claim 1, wherein obtaining the image of the virtual image presented on the display further comprises identifying pixels associated with real-world features and distinguishing real-world features located within the vehicle from real-world features located without the vehicle to track the real-world features located without the vehicle.

3. The method of claim 2, wherein identifying pixels further comprises identifying a separate group of pixels for two or more real-world features located without the vehicle in the image of the virtual image and tracking the two or more groups of pixels from a first image frame to at least a second image frame to compute a motion vector per group for the two or more groups of pixels.

4. The method of claim 3, wherein the motion vector is computed by determining a relative motion of a group of pixels of the two or more groups of pixels as each of the two or more groups are tracked from a first image frame to at least a second image frame.

5. The method of claim 3, wherein the virtual image comprises a Flight Path Vector (FPV) symbol and error associated with placement of the FPV symbol is determined from an offset between a convergence point of two or more of the motion vectors and a placement point of the FPV symbol, and wherein reducing the error comprises repositioning the placement of the FPV symbol.

6. The method of claim 1, further comprising:
   generating a symbol representing a path vector of the vehicle;
   presenting the symbol on the display, wherein the virtual image includes the symbol; and reconfiguring the presentation of the symbol based on the correction factor.

7. The method of claim 1, wherein generating a correction factor if the virtual image of the display has an error associated with the presentation on the display based on an analysis of the image further comprises comparing pixels of the image associated with real-world features to pixels associated with symbols of the virtual image to determine the error.

8. An apparatus for evaluating display accuracy, comprising:
   at least one input port configured to receive a first input for presenting a virtual image on a display of a vehicle and a second input for identifying real-world features from an image of the virtual image; and
   an image processor configured to perform the following steps:
      obtain the image of the virtual image presented on the display in flight via a stereo camera disposed on a rotating arm mounted to an overhead unit and positionable within an eyebox associated with a head-up display but outside an eye reference point within the eyebox;
      analyze the image by identifying pixels corresponding to a virtual symbol and pixels corresponding to the real-world features, calculate a convergence point, and identify an offset between the pixels corresponding to the real-world features and the convergence point;
      determine if the virtual image of the display has an error associated with the presentation on the display based on the analysis of the image;
      when an error is identified, determine if the error is associated with presenting the virtual image or if the error is associated with presenting the virtual symbol;
      generate a correction factor to a servo motor associated with the overhead unit; and
      adjust the display or a component associated with the presentation of the virtual image on the display to at least one of: reduce the error and calibrate the display.

9. The apparatus of claim 8, wherein the first input is received at least in-part from one or more sensors configured to determine speed or positional information of the vehicle including instantaneous speed, attitude, or heading.

10. The apparatus of claim 8, wherein the virtual image comprises a symbol associated with computed speed, heading, or positional information of the vehicle and reducing the error comprises reconfiguring presentation of the symbol to more closely align with observed speed, heading, or positional information of the vehicle.

11. The apparatus of claim 8, further comprising:
an output port configured to provide the correction factor for reconfiguring the presentation of the virtual image or to provide a notification that the display is calibrated.

12. A system for evaluating display accuracy, comprising:
a stereo camera for obtaining an image of a virtual image on a conformal display of a vehicle;
a non-transitory memory having instructions embedded thereon; and
a processor in communication with the non-transitory memory and the stereo camera, the processor configured to access the instructions to perform or direct steps, the steps comprising:
receiving a first input for presenting a virtual image on a conformal display of a vehicle and a second input for identifying real-world features from an image of the virtual image;
obtaining the image of the virtual image presented on the display in flight via the stereo camera disposed on a rotating arm mounted to an overhead unit and positionable within an eyebox associated with a head-up display but outside an eye reference point within the eyebox;
analyzing the image by identifying pixels corresponding to a virtual symbol and pixels corresponding to the real-world features, calculate a convergence point, and identify an offset between the pixels corresponding to the real-world features and the convergence point;
determining if the virtual image of the display has an error associated with the presentation on the display based on the analysis of the image;
when an error is identified, determining if the error is associated with presenting the virtual image or if the error is associated with presenting the virtual symbol;
generating a correction factor to a servo motor associated with the overhead unit; and
adjusting the display or a component associated with the presentation of the virtual image on the display to at least one of: reduce the error and calibrate the display.

13. The system of claim 12, wherein the virtual image comprises an image representing a computed characteristic of the vehicle, wherein the processor is further configured to identify and track the real-world features of the image of the virtual image to determine an observed characteristic, and wherein reducing the error or calibrating the display is based on a difference between the computed characteristic and the observed characteristic.

14. The system of claim 13, wherein the second input comprises two or more groups of pixels corresponding to two separate real-world features of the image of the virtual image, and wherein tracking the real-world features comprises tracking the two or more groups of pixels to result a motion vector for each of the two or more groups of pixels tracked.

15. The system of claim 12, wherein the display comprises a Head-Up Display (HUD) and the virtual image is displayed on the HUD via collimating, combining, or projecting the one or more rays of light from a light source onto a combiner.

16. The system of claim 12, wherein the vehicle comprises an aircraft and the virtual image comprises a Flight Path Vector (FPV) symbol, wherein adjusting the display or a component associated with the presentation of the virtual image on the display comprises repositioning the FPV symbol.

17. The system of claim 12, wherein obtaining the image of the virtual image presented on the display comprises identifying pixels associated with real-world features and tracking the pixels of two or more features from a first image frame to at least a second image frame and propagating resulting motion vectors to determine the convergence point of the motion vectors.

18. The system of claim 17, wherein adjusting the display or a component associated with the presentation of the virtual image on the display comprises reconfiguring the presentation of the virtual image on the display based on an offset between a symbol of the virtual image and the convergence point, wherein the reconfiguring is at least one of: automatic, in real-time, and during testing or calibration of the display.

* * * * *